Oct. 1, 1940.  E. M. EVLETH  2,216,292
CYLINDER VALVE
Filed Feb. 17, 1939
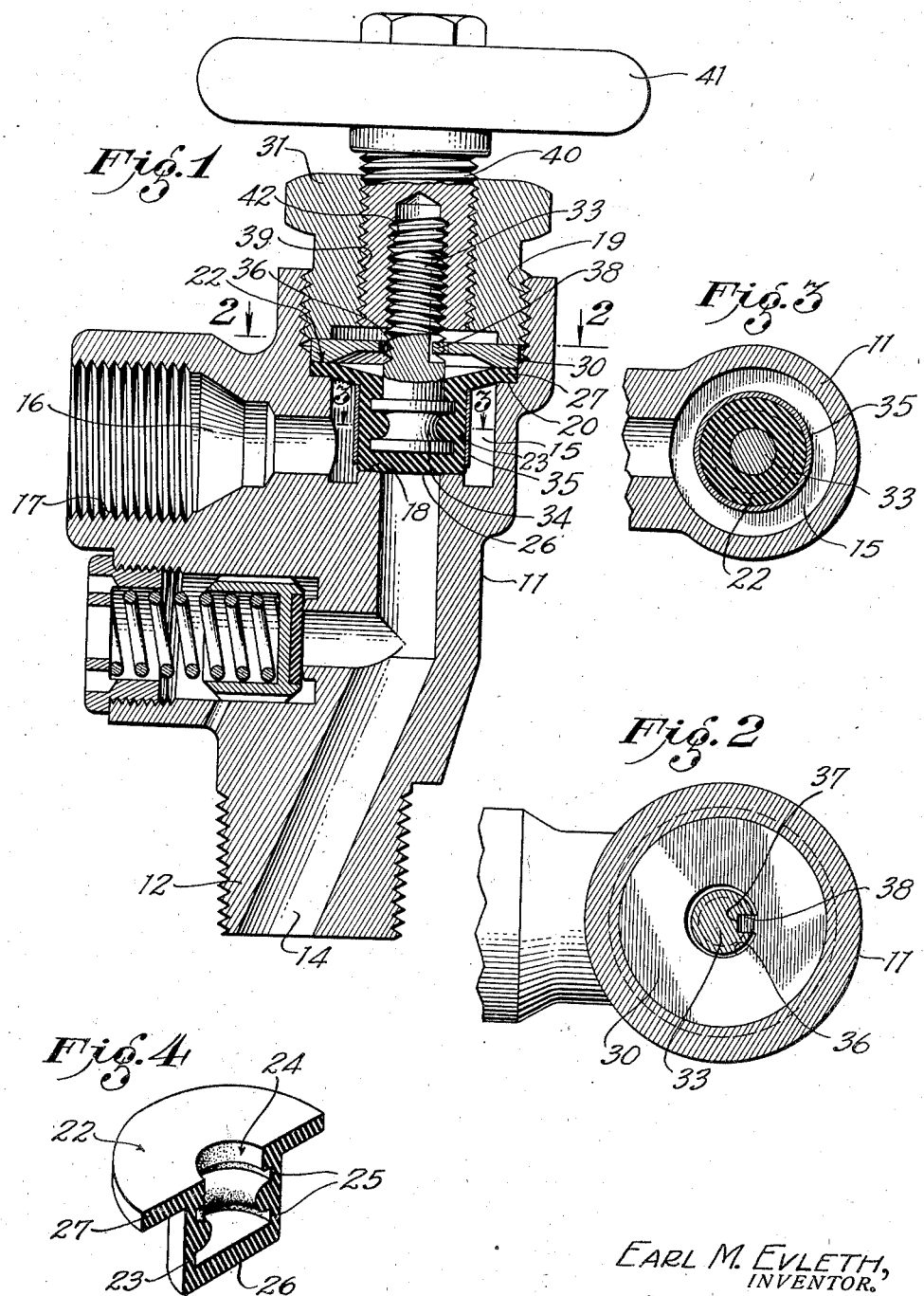
EARL M. EVLETH,
INVENTOR.
BY
ATTORNEY Patented Oct. 1, 1940

2,216,292

UNITED STATES PATENT OFFICE 2,216,292

CYLINDER VALVE

Earl M. Evleth, Inglewood, Calif., assignor to L. C. Roney, Inc., Los Angeles, Calif., a corporation of California Application February 17, 1939, Serial No. 256,952

2 Claims. (Cl. 251—24)

My invention relates to valves and relates particularly to a cylinder valve for use on high pressure gas cylinders.

It is an object of my invention to provide a valve in which there will be no leakage around the valve stem and which does not require the common packing and packing gland construction which is liable to leak and requires frequent adjustment.

It is another object of my invention to provide a valve which includes an imperforate valve and diaphragm member having a valve portion which is caused to engage the valve seat for shutting off the flow of gas through the valve.

It is another object of my invention to provide a valve of the character pointed out in the preceding paragraph in which the valve part of the valve and diaphragm member is moved by a positive force against the valve seat and is also moved by a positive force away from the valve seat.

It is another object of my invention to provide a valve having a valve and diaphragm member adapted to be moved into and from engagement with the valve seat and in which the diaphragm member may also be moved outwardly into engagement with a safety seat to prevent leakage around the valve stem should the diaphragm become worn or injured.

It is a still further object of my invention to provide as a new article of manufacture an integral valve and diaphragm member which has a valve portion providing a valve seat and a diaphragm portion which consists of a relatively flexible diaphragm which when engaged at its periphery will permit the valve portion to be moved toward and away from a valve seat.

It is also an object of my invention to provide a subcombination for use in a valve, which includes the integral valve and diaphragm member, a stem on which said member is placed, and a ferrule surrounding the member adjacent to the seat portion thereof.

Other objects and advantages of my invention will be pointed out in the course of the following detailed description of a preferred form of my invention. The form of my invention shown herein has been chosen solely for the purpose of illustrating my invention, and it should be understood that various modifications and changes may be made without departing from the spirit and scope of my invention as defined in the appended claims.

Referring to the drawing in detail:

Fig. 1 is a sectional view through a valve incorporating the features of my invention.

Fig. 2 is a section taken on the line 2—2 of Fig. 1.

Fig. 3 is a fragmentary section taken on the line 3—3 of Fig. 1.

Fig. 4 is a perspective sectional view of the valve and diaphragm member which constitutes a part of my invention.

Referring to the drawing in detail, the numeral 11 represents a valve body which is externally threaded on the plug portion 12 for securement to a cylinder or other gas container. The body 11 has a valve inlet passage 14 which connects to a valve chamber 15 and has a valve outlet passage 16 which connects to the side of the valve chamber 15 and outwardly through a threaded connection opening 17. Located in the valve chamber 15 is a valve seat 18 which is at the bottom of the valve chamber. The valve chamber 15 is connected to the exterior of the body through a threaded opening 19, and provided at the outer or top part of the valve chamber is an annular shoulder 20. Placed in the valve chamber is an integral combination valve and diaphragm member 22 which is illustrated in perspective in Fig. 4. This member 22 includes a valve portion 23 which is of cylindrical shape and has a cavity 24 provided with annular radial grooves 25. The valve portion 23 also has a valve face 26. The member 22 in addition has a diaphragm portion 27 which is annular in shape and is relatively thin and extends radially outwardly from the upper end of the valve portion 23 or from the end thereof which is opposite from the valve face 26. The valve and diaphragm member is preferably made from rubber composition or synthetic rubber and in its preferred form is so compounded that the valve face 26 and the material adjacent thereto are sufficiently hard to act satisfactorily as a valve member. The diaphragm 27, on the other hand, is so compounded that it is relatively flexible and will have a relatively long life even though it is continually flexed upward and downward during the operation of the valve.

The member 22 is placed in the valve chamber 15 with the periphery of the diaphragm 27 engaging the annular shoulder 20. Placed in the opening 19 on the exterior of the member 22 is a washer or upper safety seat 30, and threaded into the opening 19 is a bonnet element or plug 31 which presses downwardly against the washer 30, which in turn presses against the peripheral portion of the diaphragm 27 and compresses the same against the shoulder 20. This construction provides a fluid-tight joint at the shoulder 20, the valve and diaphragm member 22 extending entirely across the valve chamber 15 and forming an imperforate seal against leakage through the outlet 19.

For the purpose of operating the member 22, my invention provides a valve stem means which includes an inner valve stem 33, the inner end 34 of which rests in the cavity 24 of the valve portion 23, this inner end 34 being shaped complementary to the shape of the cavity 24. The member 22 may be molded around the inner end of the inner valve stem 33 and then vulcanized, or the parts may be assembled afterward. In order to prevent separation of the inner end 34 of the inner stem 33 from the member 22 there is provided a ferrule or other rigid member 35 which prevents the material around the inner end of the inner stem from expanding and also prevents the valve face 26 from deforming in operation. This inner stem 33 extends outwardly through an opening 36 in the washer 30 and is provided with a key-way 37 into which there extends a key 38 formed on the washer 30, which parts prevent the inner stem 33 from rotating. In this way no rotative strains are transmitted to the valve and diaphragm member 22.

The plug 31 has a threaded opening 39 and screwed thereinto is an outer stem 40 having a handle 41 whereby it may be rotated. The outer stem 40 has an inner threaded opening 42 into which the upper threaded end of the inner stem 33 is screwed. The threads on the outside of the outer stem 40 and in the threaded opening 39 of the plug 31 are right-hand threads, while the threads in the threaded opening 42 and on the outer end of the inner stem 33 are left-hand threads, with the result that when the handle 41 is rotated in a given direction the inner stem 33 is either raised or lowered at double the rate of travel of the handle 41 and outer stem 40. The stem means constitutes one of different types of operating means which may be employed for operating the valve and diaphragm member.

In Fig. 1 the valve is shown in closed position. At this time the inner stem 33 is in a relatively lowered position and holds the valve face 26 against the valve seat 16. By rotating the handle 41 in a proper direction the valve portion of the member 22 is raised, this being permitted by an upward flexing of the diaphragm 27. At this time fluid may pass through the valve. By moving the valve portion upwardly into its extreme upward position, the upper end of this valve portion and also the upper surface of the inner part of the diaphragm 27 are caused to engage the lowered face of the washer 30 and thus close the space between the washer and the member 22. When in this position the opening 36 is closed and there can be no leakage around the inner stem 33 even though the member 22 leaked either from wear or injury.

The valve and diaphragm member 22 constitutes an important part of my invention. It serves as an efficient and dependable means for opening and closing the valve passage 14, and in addition to this serves as a convenient and effective means for forming a seal against leakage through the opening 19 or around the valve stem means which operates the valve. The member 22 is of simple and economical construction and is one which will give long service.

I believe my invention to be new in the combination disclosed herein; in the member 22 which constitutes a new article of manufacture; and also in the subcombination of the stem 33, member 22, and ferrule 35. I wish my invention to be construed in accordance with the spirit and scope of the appended claims and not to be limited to the details of construction of the form of my invention which I have illustrated herein for the purpose of teaching those skilled in the art as to how my invention may be practiced.

I claim as my invention:

1. In a valve device of the character described, the combination of: a valve body having a valve chamber with an opening at one end thereof leading to the exterior and a valve seat at the other end thereof forming a valve port, and an outwardly faced shoulder contiguous to said opening; an integral valve and diaphragm member in said chamber, said member being a non-metallic molded member including a central valve portion having a valve face engageable with said valve seat and an outwardly facing cavity and including an annular flexible diaphragm overlying said shoulder; a threaded stem extending outward from said valve member, said stem having an inner end secured in the cavity of said central valve portion and said stem having a longitudinal depression in one side thereof; a plate disposed across said opening with at least the peripheral portion thereof engaging the peripheral portion of said diaphragm, said plate having an opening through which said screw passes and a projection for sliding engagement with said depression in said stem; a bonnet element secured across said opening and being operative to apply pressure to said plate to clamp said diaphragm to said shoulder, said bonnet element having an opening of larger diameter than said screw to receive the outer portion of said screw, said opening having threads in opposite hand relation to the threads of said screw; and an actuating member comprising a screw threaded into said opening of said bonnet, said screw having an axial threaded opening into which said stem is screwed whereby rotation of said actuating member will result in axial movement of said screw relative to said bonnet and axial movement of said stem relative to said screw to move said valve member relative to said seat.

2. In a valve device of the character described, the combination of: a valve body having a valve chamber with an opening at one end thereof leading to the exterior and a valve seat at the other end thereof forming a valve port, and an outwardly faced shoulder contiguous to said opening; an integral valve and diaphragm member in said chamber, said member being a non-metallic molded member including a central valve portion having a valve face engageable with said valve seat and an outwardly facing cavity and including an annular flexible diaphragm overlying said shoulder; a threaded stem extending outward from said valve member, said stem having an inner end secured in the cavity of said central valve portion and said stem having a longitudinal depression in one side thereof; a plate disposed across said opening with at least the peripheral portion thereof engaging the peripheral portion of said diaphragm, said plate having an opening through which said screw passes and a projection for sliding engagement with said depression in said stem; a bonnet element secured across said opening and being operative to apply pressure to said plate to clamp said diaphragm to said shoulder, said bonnet element having an opening of larger diameter than said screw to receive the outer portion of said screw; and an actuating member comprising a rotary part extending within said opening of said bonnet and having a threaded opening into which said stem is screwed; there being engagement between said rotary part and said bonnet to limit the axial movement of said part as it is rotated relative to said screw whereby axial movement of said screw will move said valve member relative to said seat.

EARL M. EVLETH.